No. 800,523. PATENTED SEPT. 26, 1905.
H. WELCH.
JOINT FOR CARRIAGE TOPS.
APPLICATION FILED APR. 15, 1905.

WITNESSES:
J. Smgg Poole
Robt. A. Cissel

INVENTOR
Harry Welch
By Herbert W. Jenner
Attorney

UNITED STATES PATENT OFFICE.

HARRY WELCH, OF PRAIRIE CREEK, INDIANA.

JOINT FOR CARRIAGE-TOPS.

No. 800,523.  Specification of Letters Patent.  Patented Sept. 26, 1905.

Application filed April 15, 1905. Serial No. 255,758.

*To all whom it may concern:*

Be it known that I, HARRY WELCH, a citizen of the United States, residing at Prairie Creek, in the county of Vigo and State of Indiana, have invented certain new and useful Improvements in Joints for Carriage-Tops; and I do hereby declare the following to be a full, clear, and exact description of the invention, such as will enable others skilled in the art to which it appertains to make and use the same.

This invention relates to the joints which connect the bows which support the tops of vehicles with the brackets on the frame or body and which permit the vehicle-top to be folded; and it consists in the novel construction and combination of the parts hereinafter fully described and claimed.

Figure 1:
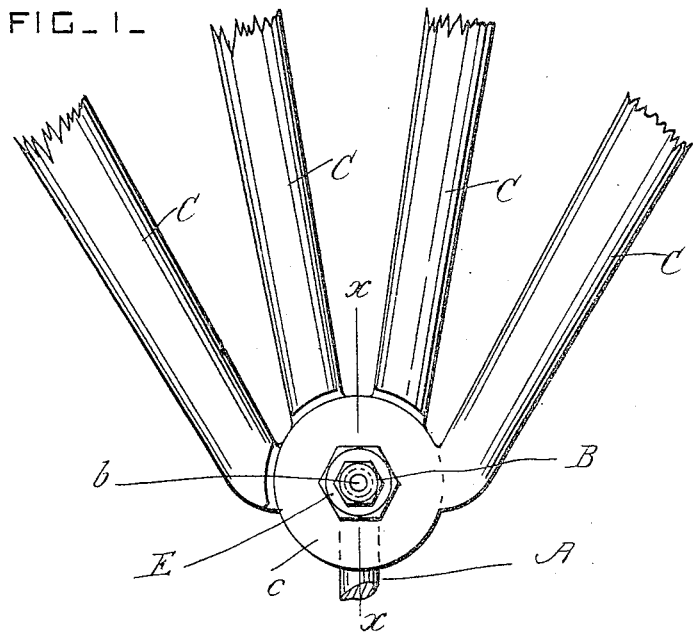
Figure 2:
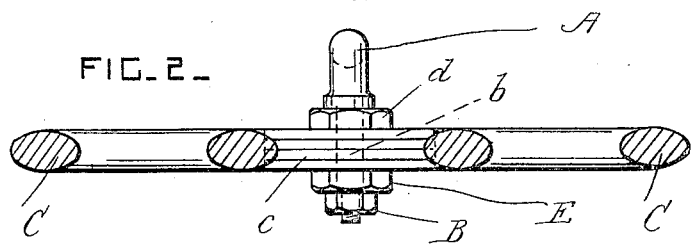
Figure 3:
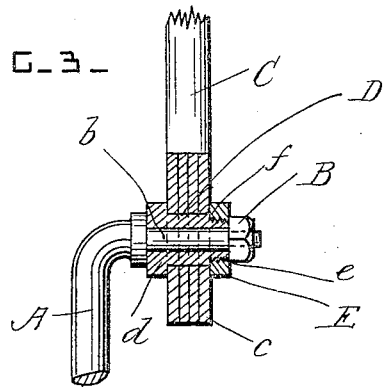

In the drawings, Figure 1 is a side view of a joint constructed according to this invention. Fig. 2 is a plan view of the joint. Fig. 3 is a cross-section through the joint, taken on the line $x$ $x$ in Fig. 1.

A is a bracket which is secured to the frame or body of the vehicle in any approved manner. This bracket is provided with a laterally-projecting pin or pivot $b$ at its upper end, and B is a nut on the free end portion of the said pin.

C represents the lower end portions of the bows which support the carriage-top. Three or more of these bows may be provided, and their upper parts and the top of the carriage are constrcted in any approved manner. The bows C are all arranged in the same plane, and they are provided with disks $c$, which are connected to them in such a manner as to permit them to have the necessary freedom of action. These disks overlap each other and are provided with central holes.

D is a tubular sleeve which is slid upon the said pin $b$ of the bracket B and is held in position by its nut. The sleeve D is provided with a head $d$ at one end, and E is a nut which is screwed upon a screw-threaded portion $e$ at the other end of the sleeve from the said head. This nut E is screwed against a shoulder $f$ on the sleeve.

The disks $c$ of the bows are pivoted upon the tubular sleeve, so that the carriage-top can be raised and lowered with facility.

The bows, together with the sleeve D and the whole top, may be removed and replaced with quickness and convenience, and when the top is removed the disks $c$ remain pivotally connected and ready to be replaced. This is very convenient for an automobile, in which the top has to be removed and replaced frequently to suit changes of weather or climate.

This joint makes a very strong and satisfactory connection of the carriage-top with the carriage-body and one which is not liable to break or get out of order.

What I claim is—

1. The combination, with a stationary bracket provided with a laterally-projecting pin, of a tubular sleeve mounted on the said pin and provided with a head and a retaining-nut, and carriage-bows provided at their lower ends with overlapping disks which are pivoted on the said sleeve.

2. The combination, with a stationary bracket provided with a laterally-projecting pin and a thumb-nut, of a tubular sleeve mounted on the said pin and provided with a shoulder and a screw-threaded portion at one end and a head at its other end, a nut engaging with the said screw-threaded portion and bearing against the said shoulder, and carriage-bows provided at their lower ends with overlapping disks which are pivoted on the said sleeve between its said head and nut.

3. The combination, with carriage-bows provided with overlapping disks, of a tubular sleeve having said disks pivoted on it, said sleeve having a head at one end and a removable nut at its other end which retain the said disks in position.

In testimony whereof I have affixed my signature in the presence of two witnesses.

HARRY WELCH.

Witnesses:
 EDGAR A. KRUZAN,
 JAMES M. KRUZAN.